United States Patent
Cheng

(10) Patent No.: US 10,802,682 B2
(45) Date of Patent: Oct. 13, 2020

(54) METHOD AND APPARATUS FOR SWITCHING APPLICATION INTERFACE

(71) Applicant: Tencent Technology (Shenzhen) Company Limited, Shenzhen (CN)

(72) Inventor: Gang Cheng, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 412 days.

(21) Appl. No.: 15/188,908

(22) Filed: Jun. 21, 2016

(65) Prior Publication Data

US 2016/0299653 A1  Oct. 13, 2016

Related U.S. Application Data

(63) Continuation of application No. PCT/CN2014/093128, filed on Dec. 5, 2014.

(30) Foreign Application Priority Data

Apr. 18, 2014  (CN) .......................... 2014 1 0159212

(51) Int. Cl.
   *G06F 3/0484* (2013.01)
   *G06F 9/451* (2018.01)
   (Continued)

(52) U.S. Cl.
   CPC .......... *G06F 3/0484* (2013.01); *G06F 3/0481* (2013.01); *G06F 3/0485* (2013.01); *G06F 3/04883* (2013.01); *G06F 9/453* (2018.02)

(58) Field of Classification Search
   CPC ....................................................... G06F 3/048
   See application file for complete search history.

(56) References Cited

U.S. PATENT DOCUMENTS 6,956,590 B1 * 10/2005 Barton ................. G01C 21/367
                                                        345/671
9,632,578 B2 *  4/2017 Bae ........................... G06F 3/01
(Continued)

FOREIGN PATENT DOCUMENTS

CN        102375650 A     3/2012
CN        102566929 A     7/2012
(Continued)

OTHER PUBLICATIONS

Tencent Technology, IPRP, PCT/CN2014/093128, Oct. 18, 2016, 7 pgs.

(Continued)

*Primary Examiner* — Liang Y Li
(74) *Attorney, Agent, or Firm* — Morgan, Lewis & Bockius LLP

(57) ABSTRACT

A method for switching an application interface at an apparatus is disclosed. The method is performed at a computer system having one or more processors and memory for storing programs to be executed by the one or more processors. The method includes receiving, from a user of the apparatus, an interface switching instruction with respect to an original application interface that is currently displayed at the apparatus. The interface switching instruction includes information indicating a two-dimensional direction from a stored set of two-dimensional directions. The method includes retrieving a predefined database that includes two-dimensional location information associated with a group of application interfaces including the original application interface. The method also includes determining, based on the two-dimensional direction and the two-dimensional location information, a target application interface from the group of application interfaces. The method further includes (Continued)

switching to display the target application interface at the apparatus.

14 Claims, 9 Drawing Sheets

(51) Int. Cl.
    *G06F 3/0485*     (2013.01)
    *G06F 3/0481*     (2013.01)
    *G06F 3/0488*     (2013.01)

(56) References Cited

U.S. PATENT DOCUMENTS

| | | | |
|---|---|---|---|
| 2006/0190833 A1* | 8/2006 | SanGiovanni | G06F 3/04883 715/767 |
| 2007/0097150 A1* | 5/2007 | Ivashin | G06F 3/0485 345/660 |
| 2011/0078624 A1* | 3/2011 | Missig | G06F 3/04883 715/802 |
| 2013/0135234 A1* | 5/2013 | Hisano | G06F 3/017 345/173 |
| 2013/0215021 A1* | 8/2013 | Morikawa | G06F 3/041 345/157 |
| 2013/0290887 A1* | 10/2013 | Sun | G06F 3/0482 715/769 |
| 2014/0123013 A1* | 5/2014 | Lee | G06F 3/0481 715/719 |
| 2014/0282214 A1* | 9/2014 | Shirzadi | G06F 3/04883 715/781 |
| 2014/0304278 A1* | 10/2014 | Kleiman | G06F 16/583 707/749 |

FOREIGN PATENT DOCUMENTS

| | | |
|---|---|---|
| CN | 103135903 A | 6/2013 |
| CN | 103279295 A | 9/2013 |
| CN | 103472949 A | 12/2013 |
| CN | 104142792 A | 11/2014 |

OTHER PUBLICATIONS

Tencent Technology, ISRWO, PCT/CN2014/093128, dated Feb. 26, 2015, 9 pgs.

* cited by examiner

METHOD AND APPARATUS FOR SWITCHING APPLICATION INTERFACE

PRIORITY CLAIM AND RELATED APPLICATION

This application is a continuation application of PCT Patent Application No. PCT/CN2014/093128, entitled "METHOD AND APPARATUS FOR SWITCHING APPLICATION INTERFACE" filed on Dec. 5, 2014, which claims priority to Chinese Patent Application Serial No. 201410159212.4, entitled "METHOD AND APPARATUS FOR SWITCHING APPLICATION INTERFACE", filed on Apr. 18, 2014, both of which are incorporated herein by reference in their entirety.

FIELD OF THE APPLICATION

The present application generally relates to the field of computer technologies, and more particularly to a method and apparatus for switching an application interface at an apparatus.

BACKGROUND

As various application programs have been developed for terminal devices, users of the terminal devices typically need to place icons of the application programs in multiple application interfaces (e.g., desktops). Some known terminal devices enable users to switch an application interface (i.e., from a currently-displayed application interface to a target application interface) using interface switching instructions. Such known terminal devices typically implement one-dimensional slide operations (e.g., slide from left to right, slide from right to left) for switching an application interface. Such a switching method can require a large number of slide operations for a large number of application interfaces. For example, to switch among 9 different application interfaces, a terminal device implementing a one-directional, one-dimensional slide operation (e.g., slide from left to right) as the method for switching requires 4 slide operations on average for a switch operation (calculated as $(0\times1+1\times1+2\times1+3\times1+4\times1+5\times1+6\times1+7\times1+8\times1)/9=4$). Similarly, a terminal device implementing a two-directional, one-dimensional slide operation (e.g., slide from left to right and slide from right to left) as the method for switching requires 2.22 slide operations on average for a switch operation (calculated as $(0\times1+1\times2+2\times2+3\times2+4\times2)/9=2.22$). Thus, the known switching method can be complicated and burdensome for the users, and cause low efficiency.

Therefore, a need exists for a method and apparatus that can reduce the number of operations in switching among a large number of application interfaces, thus improving efficiency.

SUMMARY

The above deficiencies associated with the known switching method may be addressed by the techniques described herein.

In some embodiments, a method for switching an application interface at an apparatus is disclosed. The method is performed at a computer system, which has one or more processors and memory for storing programs to be executed by the one or more processors. The method includes receiving, from a user of the apparatus, an interface switching instruction with respect to an original application interface that is currently displayed at the apparatus. The received interface switching instruction includes information indicating a two-dimensional direction from a stored set of two-dimensional directions. In some instances, the stored set of two-dimensional directions includes at least a vertical direction, a horizontal direction, and a diagonal direction.

The method includes retrieving a predefined database that includes two-dimensional location information associated with a set of application interfaces. The set of application interfaces includes the original application interface. The method also includes determining, based on the two-dimensional direction indicated by the interface switching instruction and the two-dimensional location information included in the predefined database, a target application interface from the set of application interfaces. In some instances, the original application interface and the target application interface are associated by the two-dimensional direction, and the association is stored in the predefined database. The method further includes switching to display the target application interface at the apparatus.

In some instances, to receive the interface switching instruction, the method includes detecting a slide operation performed by the user with respect to the original application interface. The method also includes determining the two-dimensional direction based on the slide operation. In some instances, the two-dimensional direction is the direction from the stored set of two-dimensional directions that most closely matches the track of the slide operation.

Furthermore, in some instances, the method includes, before switching to display the target application interface, determining that a detected length of the track of the slide operation projected onto the two-dimensional direction is greater than a first length threshold. The method can also include determining that a detected length of the track of the slide operation projected onto the two-dimensional direction is greater than a second length threshold less than the first length threshold, and then providing to the user information that indicates the switch from the original application interface to the target application interface. In some instances, the providing information includes displaying a portion of the target application interface at the apparatus.

In some embodiments, an apparatus includes one or more processors and memory storing one or more programs for execution by the one or more processors. The one or more programs include instructions that cause the apparatus to perform the method for switching an application interface as described above. In some embodiments, a non-transitory computer readable storage medium stores one or more programs including instructions for execution by one or more processors. The instructions, when executed by the one or more processors, cause the processors to perform the method for switching an application interface at an apparatus as described above.

Various advantages of the present application are apparent in light of the descriptions below.

BRIEF DESCRIPTION OF DRAWINGS

The aforementioned implementation of the application as well as additional implementations will be more clearly understood as a result of the following detailed description of the various aspects of the application when taken in conjunction with the drawings.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present application comprehensible, embodiments of the present application are further described in detail below with reference to the accompanying drawings.

Figure 1:
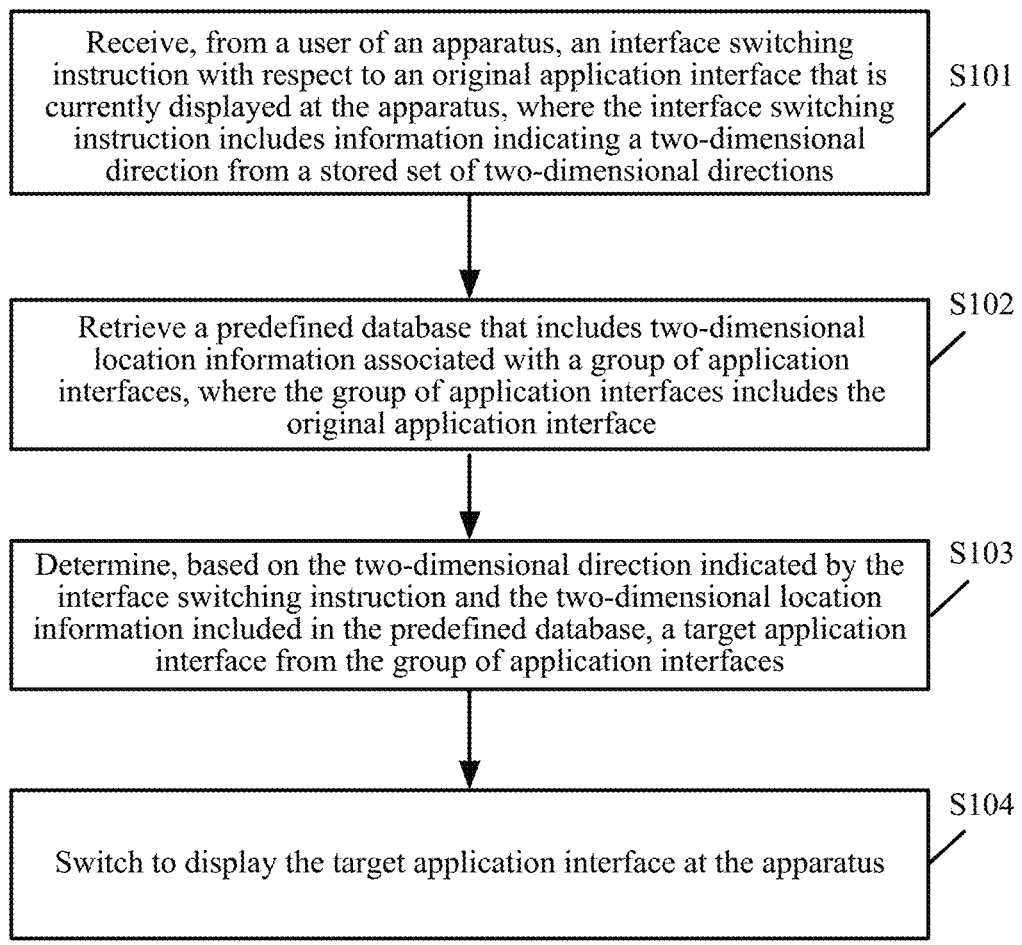
FIG. 1 is a flow chart illustrating a method performed at an apparatus for switching an application interface in accordance with some embodiments.

FIG. 1 is a flow chart illustrating a method 100 performed at an apparatus for switching an application interface in accordance with some embodiments. The apparatus performing the method 100 can be any type of apparatus, device, tool and/or machine that can be used for displaying multiple application interfaces and switching an application interface. In some embodiments, the apparatus performing the method 100 can be, for example, a smart phone, a mobile Internet device (MID), a personal digital assistant (PDA), a wearable device, a tablet computer, a laptop computer, a handheld computer, a desktop computer, a workstation, a server, a personal computer, an e-reader, an Internet TV, a vehicle terminal, and/or any other electronic device that can be used for displaying one of multiple application interfaces.

In some embodiments, the apparatus can be a portion, a module or a component of a device (e.g., the devices listed above). In such embodiments, the apparatus can include, for example, a hardware-based module (e.g., a digital signal processor (DSP), an application-specific integrated circuit (ASIC), a field programmable gate array (FPGA), etc.), a software-based module (e.g., a module of computer code executed at a processor, a set of processor-readable instructions executed at a processor, etc.), or a combination of hardware and software modules. Instructions or code of such an apparatus can be stored in a memory of a device (i.e., the device that hosts the apparatus) and executed at a processor (e.g., CPU) of the device.

In operation, the apparatus can be configured to store information of a set of multiple application interfaces. Each application interface from the set of application interfaces includes a group of one or more icons, each of which represents an application program executed at the apparatus. At any given time, the apparatus can be configured to display one application interface from the group of application interfaces at, for example, a display device (e.g., a screen, a monitor) of the apparatus. A user of the apparatus can then execute an application program, whose icon is included in the currently-displayed application interface, by manipulating (e.g., clicking) the icon of the application program that is displayed at the apparatus.

In some embodiments, each application program associated with an application interface (that is, the icon of the application program is included in the application interface) can be different from each application program associated with another application interface. In other embodiments, two different application interfaces can both include an icon of the same application program. Additionally, in some embodiments, other than the group of application interfaces, the apparatus can be configured to display other types of interfaces such as, for example, a settings interface, a configuration interface, etc. In some embodiments, the apparatus performing the method 100 can be referred to as, for example, a client device, a user device, a mobile device, a terminal device, a portable device, and/or the like. Details of such an apparatus are shown and described below with respect to FIGS. 5-9.

In some embodiments, the apparatus performing the method 100 can include one or more processors and memory. In such embodiments, the method 100 is implemented using instructions or code of an application that are stored in a non-transitory computer readable storage medium of the apparatus and executed by the one or more processors of the apparatus. The application is associated with switching from a currently-displayed application interface (e.g., an original application interface) to a to-be-displayed application interface (e.g., a target application interface). Such an application can be stored in a memory of the apparatus (e.g., the non-transitory computer readable storage medium of the apparatus) and executed at a processor of the apparatus. As shown in FIG. 1, the method 100 includes the following steps.

At S101, the apparatus receives, from a user of the apparatus, an interface switching instruction with respect to an original application interface that is currently displayed at the apparatus. The interface switching instruction includes information indicating a two-dimensional direction from a stored set of two-dimensional directions. In some embodiments, the user can enter the interface switching instruction using various input methods such as, for example, performing a slide operation (e.g., using the user's finger) on a touchscreen of the apparatus, drawing a two-dimensional direction using a mouse, clicking a button indicating a two-dimensional direction using a mouse, pressing a key on a keyboard of the apparatus indicating a two-dimensional direction (e.g., the "←", "↑", "→", "↓" keys), or any other suitable input method.

In some embodiments, the stored set of two-dimensional directions includes one or more two-dimensional directions that are predefined and stored at, for example, a memory of the apparatus. Each two-dimensional direction included in the stored set of two-dimensional directions indicates a unique direction in a two-dimensional plane, and is different from each remaining two-dimensional direction included in the stored set of two-dimensional directions. In some embodiments, for example, the stored set of two-dimensional directions includes a vertical direction (e.g., upwards, downwards), a horizontal direction (e.g., from left to right, from right to left), and/or a diagonal direction (e.g., from lower-right to upper-left, from lower-left to upper-right, from upper-right to lower-left, from upper-left to lower-right).

Figure 8:
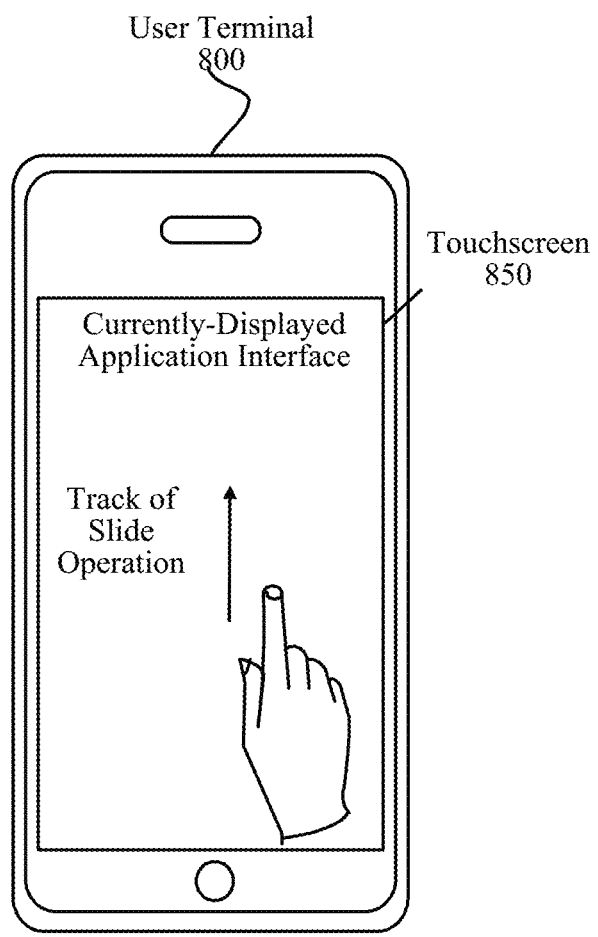
FIG. 8 is a schematic diagram illustrating a user performing a slide operation to enter an interface switching instruction in accordance with some embodiments.

As an example, FIG. 8 is a schematic diagram illustrating a user performing a slide operation to enter an interface switching instruction in accordance with some embodiments. As shown in FIG. 8, the user performs a slide operation on a touchscreen 850 of a user terminal 800 (i.e., an apparatus) to enter an interface switching instruction. The track of the slide operation is a straight line pointing vertically upwards. As a result, the user terminal 800 receives the interface switching instruction entered by the user, which includes information indicating an upward direction from a stored set of two-dimensional directions.

Figure 9:
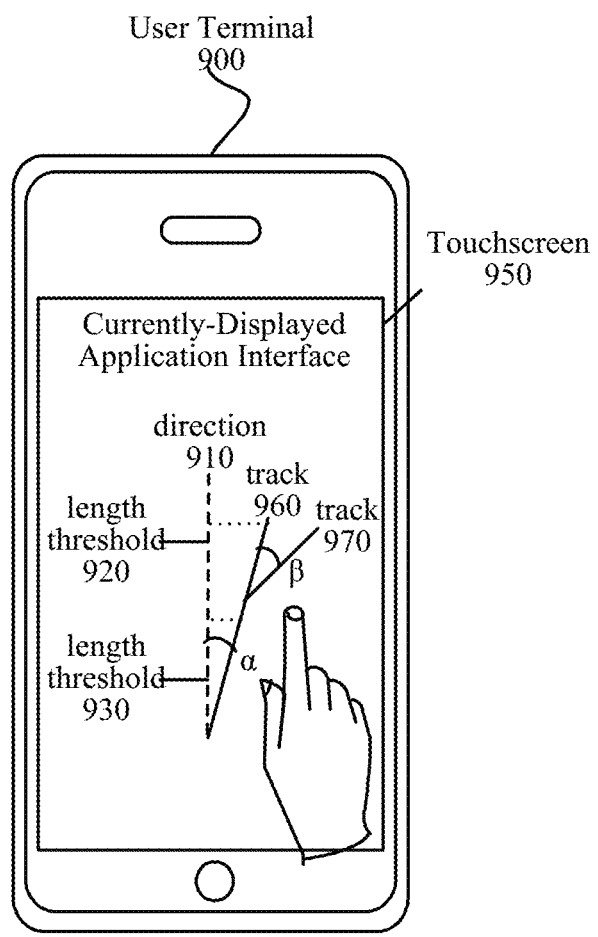
FIG. 9 is a schematic diagram illustrating an apparatus detecting and analyzing slide operations entered by a user in accordance with some embodiments.

Although shown in FIG. 8 as the slide operation having a linear track, in some embodiments, a slide operation performed on a touchscreen of an apparatus as an input for an interface switching instruction can have a non-linear track. For example, the track of the slide operation can be a polyline or polygonal chain as shown in FIG. 9. For another example, the track of the slide operation can be a curve (not shown in FIG. 8 or FIG. 9). In some embodiments, the track of the slide operation for entering an interface switching instruction can be in any shape.

Furthermore, as discussed above, a user can enter an interface switching instruction using various input methods other than performing a slide operation. For example, the user can use a mouse to draw or drag a line on a display device (e.g., a screen, a monitor) of the apparatus to indicate a two-dimensional direction. For another example, the user can use a mouse to click a button (e.g., a button indicating a direction such as a "←" button, a "↑" button, a "→" button, a "↓" button) displayed on a display device of the apparatus to indicate a two-dimensional direction. For yet another example, the user can use a keyboard of the apparatus to press a key (e.g., the "←" key, the "↑" key, the "→" key, the "↓" key) to indicate a two-dimensional direction.

Returning to FIG. 1, at S102, the apparatus retrieves a predefined database that includes two-dimensional location information associated with a group of application interfaces. The group of application interfaces includes the original application interface. Each application interface from the group of application interfaces can be displayed at the apparatus. In other words, each application interface from the group of application interface can potentially be the application interface that is to be displayed at the apparatus in accordance with the user's interface switching instruction.

In some embodiments, the predefined database includes information indicating a two-dimensional location relation between each application interface and each other application interface from the group of application interfaces. In some other embodiments, the predefined database includes information indicating a two-dimensional location relation between each application interface and at least one or more other application interfaces from the group of application interfaces. In other words, the predefined database stores information of an association (i.e., two-dimensional location relation) between each application interface from the group of application interfaces and at least another application interface from the group of application interfaces. Additionally, information of the association (i.e., two-dimensional location relation) can be stored in various suitable forms in the predefined database such as, for example, a list, a graph, a table, etc.

Figure 10:
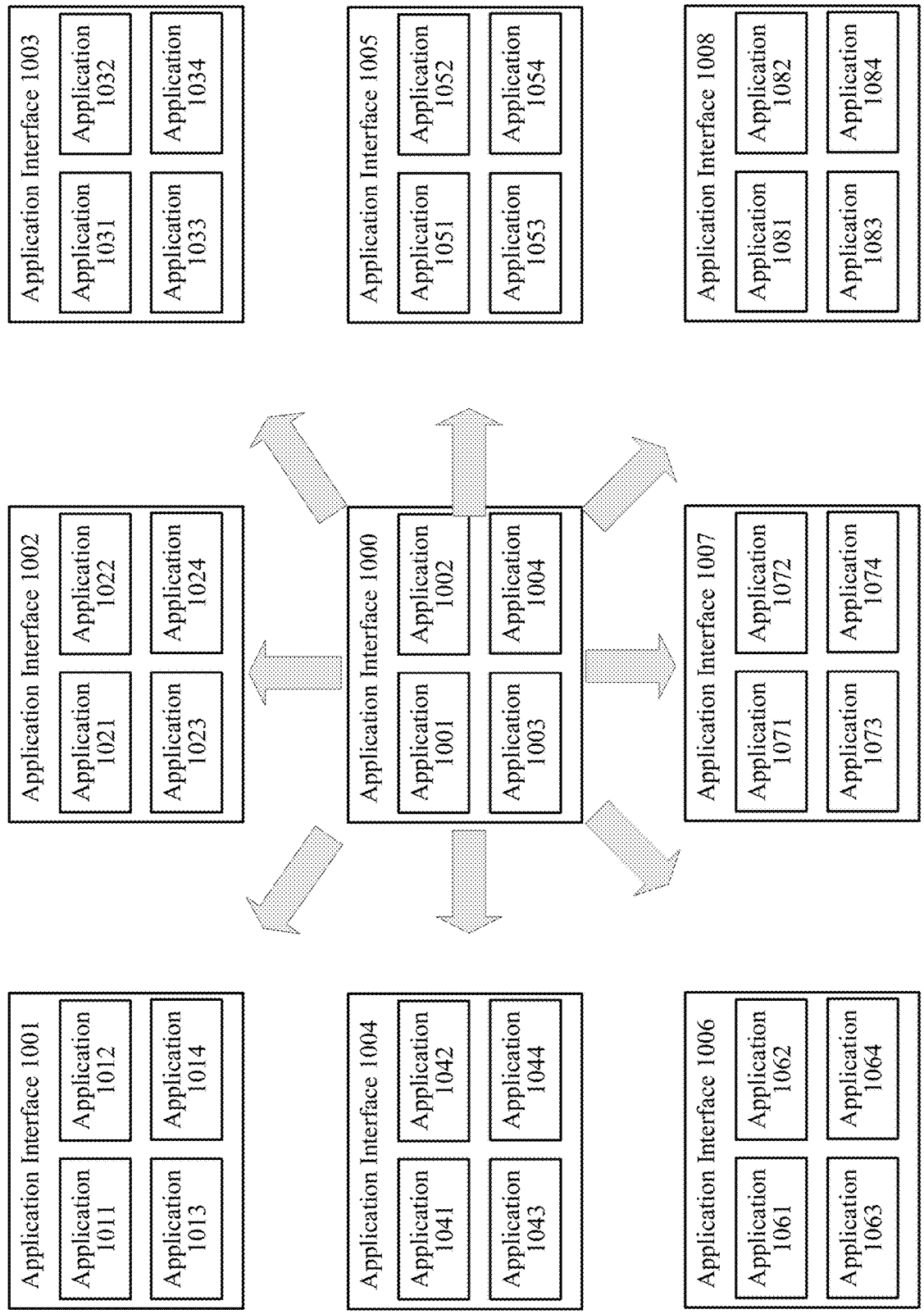
FIG. 10 is a schematic diagram illustrating two-dimensional location information associated with multiple application interfaces in accordance with some embodiments.

As an example, FIG. 10 is a schematic diagram illustrating two-dimensional location information associated with multiple application interfaces in accordance with some embodiments. As shown in FIG. 10, two-dimensional location information associated with a group of nine application interfaces 1000-1008 for an apparatus (not shown in FIG. 10) is illustrated, and such location information can be stored in a predefined database (not shown in FIG. 10) of the apparatus. Each application interface includes icons of four applications. The application interface 1000, as an original application interface (that is, the application interface currently displayed at an apparatus), is associated with each of the remaining eight application interfaces 1001-1008 via a two-dimensional direction.

Specifically, as shown in FIG. 10, the application interface 1000 is associated with each of the application interfaces 1001-1008 via, respectively, a diagonal direction from lower-right to upper-left (for the application interface 1001), a vertical upward direction (for the application interface 1002), a diagonal direction from lower-left to upper-right (for the application interface 1003), a horizontal right-to-left direction (for the application interface 1004), a horizontal left-to-right direction (for the application interface 1005), a diagonal direction from upper-right to lower-left (for the application interface 1006), a vertical downward direction (for the application interface 1007), and a diagonal direction from upper-left to lower right (for the application interface 1008).

Thus, a user of the apparatus can enter an interface switching instruction indicating a two-dimensional direction to select a target application interface from the application interfaces 1001-1008. For example, if the interface switching instruction entered by the user indicates a diagonal direction from lower-left to upper-right, then the application interface 1003 is selected as the target application interface based on the two-dimensional location information shown in FIG. 10. Similarly, for example, if the user intends to switch to the application interface 1007, according to the two-dimensional location information shown in FIG. 10, the user can enter an interface switching instruction indicating a vertical downward direction.

Although shown in FIG. 10 as two-dimensional location information associated with nine application interfaces being illustrated, in some embodiments, a predefined database of an apparatus can include two-dimensional location information associated with more or less than nine application interfaces. In the example of FIG. 10, application interfaces 1000-1008 are arranged in two levels: the application interface 1000 is at the first level and the application interfaces 1001-1008 are at the second level extended from the first level (e.g., arranged around the application interface 1000). In some embodiments, for example, application interfaces can be arranged in three levels. In such embodiments, similar to the arrangement of application interfaces in FIG. 10, the third level is extended from the second level and application interfaces at the third level are arranged around the application interfaces at the second level.

In some embodiments, in an arrangement of application interfaces similar to that shown in FIG. 10, the number of application interfaces S in the arrangement is upper-bounded by the number of levels N as: $S \leq (2 \times N-1)^2$. For example, when N is 3, S is upper-bounded by 25. That is, at most 25 application interfaces can be arranged in a 5×5 matrix similar to the 3×3 matrix for 9 application interfaces (which is the maximum number of application interfaces for two levels) shown in FIG. 10. In such an arrangement, an interface switching instruction consisting of two two-dimensional directions is required to connect an original application interface at the center of the 5×5 matrix (similar to the application interface 1000 in FIG. 10) to any target application interface at the third level in the arrangement. Alternatively, two consecutive interface switching instructions each including one two-dimensional direction can be used to connect the original application interface at the center of the 5×5 matrix to any target application interface at the third level in the arrangement.

In some embodiments, when a large number of application interfaces are potentially available to be selected as a target application interface for an original application interface (that is, an application interface currently displayed at an apparatus), the original application interface can be switched to a target application via one or more interface switching instructions, each of which consists of one or more two-dimensional directions. In such embodiments, the switching can be performed in a method similar to the method described above for the 5×5 matrix arrangement.

Furthermore, although shown in FIG. 10 as the original application interface 1000 being associated with all of the remaining eight application interfaces 1001-1008 (as target application interfaces) via two-dimensional directions, in some embodiments, an original application interface can be associated with a portion of other application interfaces. In other words, the original application interface is not switched to every other application interface via an interface switching instruction including a single two-dimensional direction. In such a scenario, the original application interface can be switched to a target application interface via an intermediate application interface, using two series of two-dimensional directions (included in one or two interface switching instructions).

Additionally, although shown in FIG. 10 and discussed above as the application interfaces (two-dimensional location information associated with which is stored in a predefined database) being associated with each other in a MxM (e.g., 3×3, 5×5) matrix with the original application interface being at the center of the matrix, in some embodiments, the application interfaces can be associated with each other in any other suitable arrangement. For example, the application interfaces can be arranged within a circle where the original application interface is at the center of the circle. For another example, the original application interface can be at an edge of a matrix (e.g., the application interface 1004 in FIG. 10 being the original application interface). Moreover, in some embodiments, arrangements of application interfaces as stored in the predefined database can be modified, updated, customized or changed by a user, administrator, operator, developer, etc., of the apparatus that stores the predefined database. In other words, the predefined database stored at the apparatus can be modified to implement a different method for switching an application interface displayed at the apparatus.

Returning to FIG. 1, at S103, the apparatus determines, based on the two-dimensional direction indicated by the interface switching instruction and the two-dimensional location information included in the predefined database, a target application interface from the group of application interfaces. Specifically, the apparatus uses the original application interface (i.e., the application interface currently being displayed at the apparatus) as a starting point in the two-dimensional location arrangement for the group of application interfaces that is stored in the predefined database. The apparatus then applies the two-dimensional direction on the original application interface to determine an end point in the two-dimensional location arrangement. The application interface corresponding to the end point in the two-dimensional location arrangement is determined as the target application interface.

In the example of FIG. 8 and FIG. 10, the original application interface is the application interface 1000 in FIG. 10. The user performs a slide operation having a linear track to enter an interface switching instruction. Such an interface switching instruction indicates a two-dimensional direction of pointing vertically upwards as shown in FIG. 8. By applying the vertical upward two-dimensional direction in the two-dimensional location arrangement in FIG. 10, the apparatus determines that the application interface 1002 is the target application interface. Thus, the display of the apparatus switches from the application interface 1000 to the application interface 1002 via a simple slide operation indicating an interface switching instruction.

As shown in the example of FIG. 10, the apparatus can implement, for example, two-dimensional slide operation as a method for switching among 9 different application interfaces 1000-1008. As a result, the apparatus requires 0.89 slide operation on average for a switch operation (calculated as $(0 \times 1 + 1 \times 8)/9 = 0.89$). Comparing to a required 4 slide operations on average for one-directional one-dimensional slide operation method and a required 2.22 slide operations on average for two-directional one-dimensional slide operation method (discussed in the Background section), the two-dimensional slide operation method substantially reduces the required number of slide operations for one switch operation, thus improving the efficiency.

Returning to FIG. 1, at S104, the apparatus switches to display the target application interface at the apparatus. Thus, the switch of application interface is completed, and the target application interface replaces the original application interface at the display of the apparatus.

Figure 2:
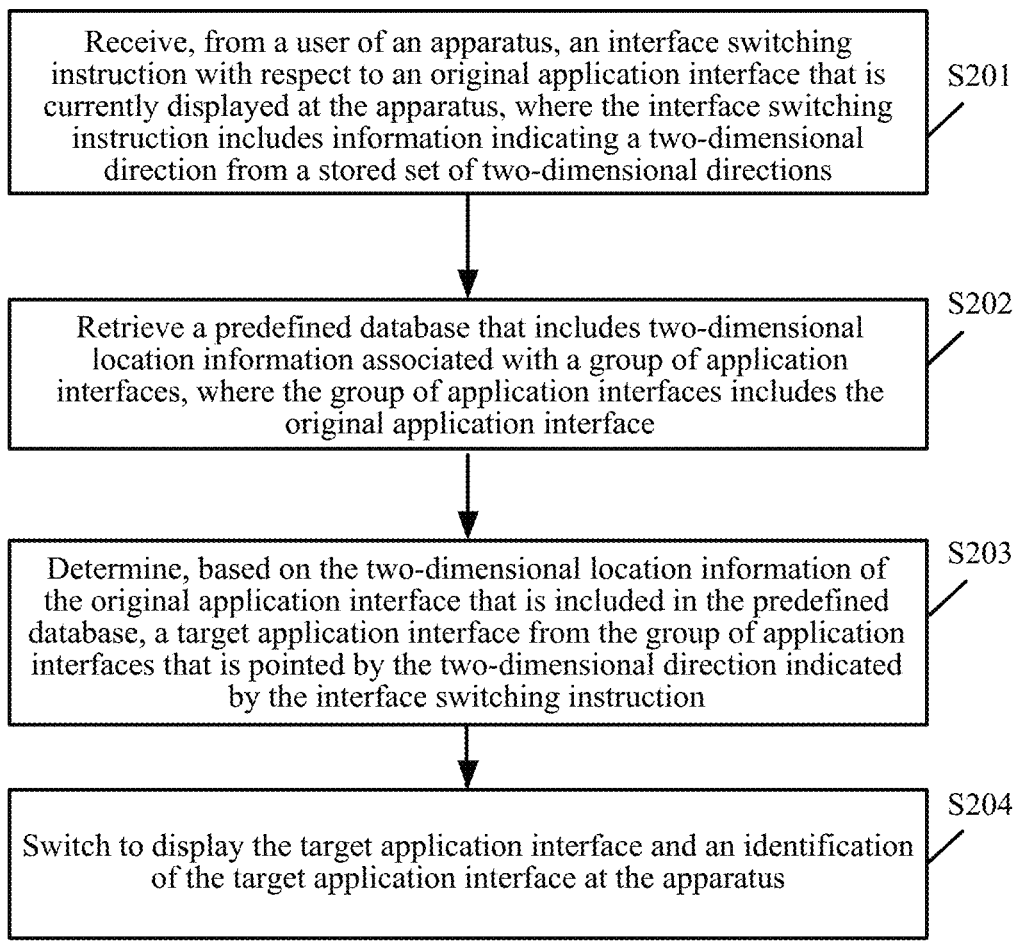
FIG. 2 is a flow chart illustrating another method performed at an apparatus for switching an application interface in accordance with some embodiments.

FIG. 2 is a flow chart illustrating another method 200 performed at an apparatus for switching an application interface in accordance with some embodiments. The apparatus performing the method 200 can be structurally and functionally similar to the apparatus performing the method 100 described above with respect to FIG. 1. Particularly, the apparatus performing the method 200 can include one or more processors and memory. The method 200 is implemented using instructions or code of an application that are stored in a non-transitory computer readable storage medium of the apparatus and executed by the one or more processors of the apparatus. The application is associated with switching from a currently-displayed application interface (e.g., an original application interface) to a to-be-displayed application interface (e.g., a target application interface). Such an application can be stored in a memory of the apparatus (e.g., the non-transitory computer readable storage medium of the apparatus) and executed at a processor of the apparatus. As shown in FIG. 2, the method 200 includes the following steps.

At S201, the apparatus receives, from a user of the apparatus, an interface switching instruction with respect to an original application interface that is currently displayed at the apparatus. The interface switching instruction includes information indicating a two-dimensional direction from a stored set of two-dimensional directions. Operations of S201 are similar to the operations of S101 shown and described above with respect to FIG. 1. Particularly, in some embodiments, the user can enter the interface switching instruction into the apparatus using any suitable input method. In some embodiments, the stored set of two-dimensional directions includes at least a vertical direction, a horizontal direction, and a diagonal direction.

At S202, the apparatus retrieves a predefined database that includes two-dimensional location information associated with a group of application interfaces. The group of application interfaces includes the original application interface. Operations of S202 are similar to the operations of S102 shown and described above with respect to FIG. 1. Particularly, in some embodiments, the predefined database includes information indicating a two-dimensional location relation between each application interface (as an original application interface) from the group of application interfaces and one or more other application interfaces (as potential target application interfaces for that original application interface) from the group of application interfaces.

At S203, the apparatus determines, based on the two-dimensional location information of the original application interface that is included in the predefined database, a target application interface from the group of application interfaces that is pointed by the two-dimensional direction indicated by the interface switching instruction. Operations of S203 are similar to the operations of S103 shown and described above with respect to FIG. 1. For example, as shown and described above with respect to FIG. 10, starting from the original application interface 1000, the application interfaces 1001-1008 can be target application interfaces pointed by the two dimensional directions lower-right to upper-left, vertical upward, lower-left to upper-right, horizontal right-to-left, horizontal left-to-right, upper-right to lower-left, vertical downward, and upper-left to lower right, respectively.

At S204, the apparatus switches to display the target application interface and an identification of the target application interface at the apparatus. The identification of the target application interface can be identification in any suitable form (e.g., text, image, symbol, animation, number, icon, etc.) that can be used to differentiate the target application interface from other application interfaces and can be displayed with the target application interface at the apparatus.

Figure 3:
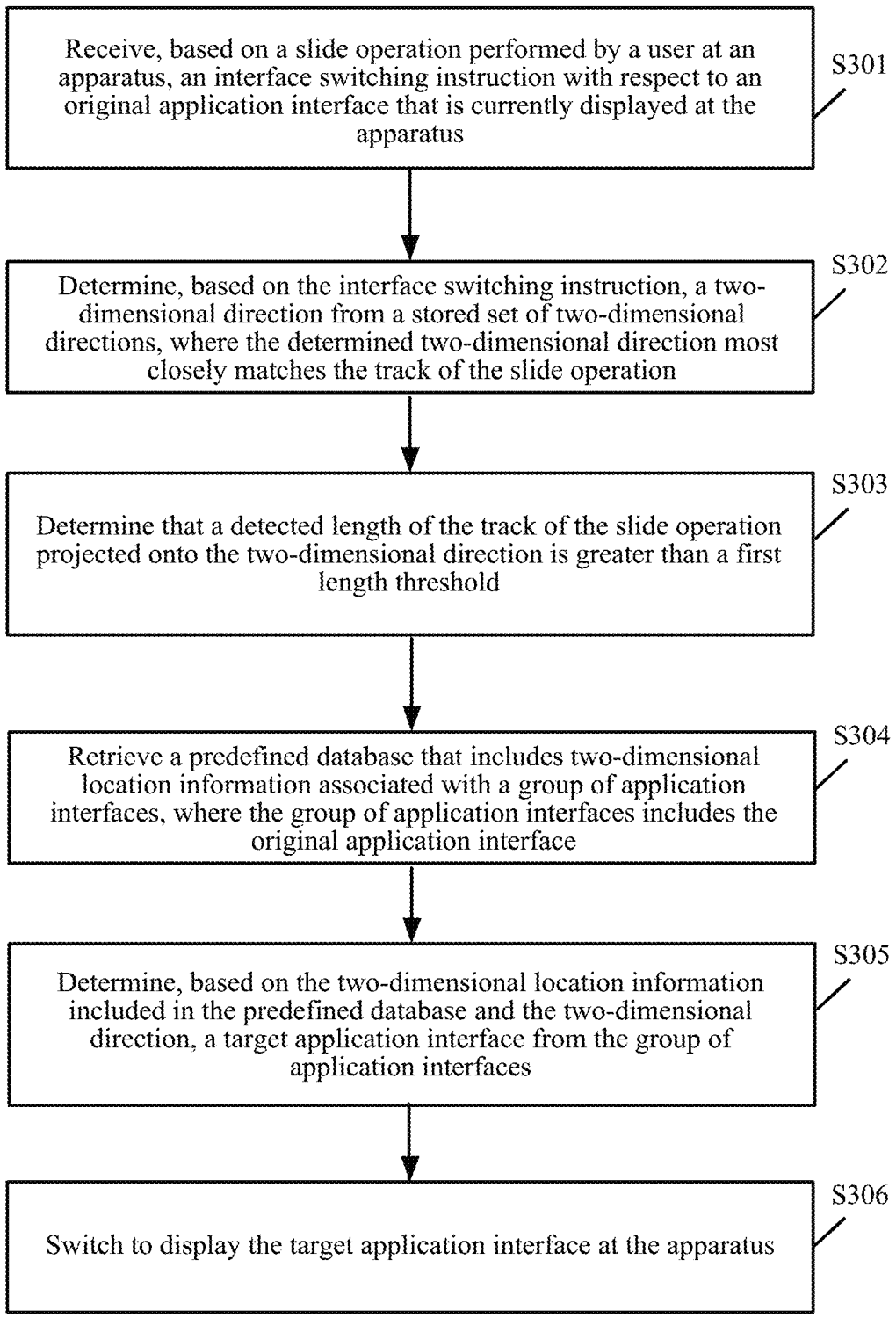
FIG. 3 is a flow chart illustrating another method performed at an apparatus for switching an application interface in accordance with some embodiments.

FIG. 3 is a flow chart illustrating another method 300 performed at an apparatus for switching an application interface in accordance with some embodiments. The apparatus performing the method 300 can be structurally and functionally similar to the apparatus performing the method 100 described above with respect to FIG. 1. Particularly, the apparatus performing the method 300 can include one or more processors and memory. The method 300 is implemented using instructions or code of an application that are stored in a non-transitory computer readable storage medium of the apparatus and executed by the one or more processors of the apparatus. The application is associated with switching from a currently-displayed application interface (e.g., an original application interface) to a to-be-displayed application interface (e.g., a target application interface). Such an application can be stored in a memory of the apparatus (e.g., the non-transitory computer readable storage medium of the apparatus) and executed at a processor of the apparatus. As shown in FIG. 3, the method 300 includes the following steps.

Operations of S301-S302 are similar to the operations of S101 and S201 shown and described above with respect to FIGS. 1 and 2. At S301, the apparatus receives, based on a slide operation performed by a user at an apparatus, an interface switching instruction with respect to an original application interface that is currently displayed at the apparatus. Specifically, the apparatus detects and tracks the slide operation to obtain information of the track of the slide operation. In some embodiments, the apparatus can implement any suitable detecting technique to detect and track the slide operation performed on, for example, a touchscreen of the apparatus. Additionally, in some embodiments, the apparatus can determine one or more two-dimensional directions based on the detected track of the slide operation. Such determined two-dimensional direction(s) can be used to determine the two-dimensional direction indicated by the interface switching instruction in the next step S302.

In some embodiments, the apparatus can distinguish a slide operation that is intended to be an interface switching instruction and a slide operation that is not intended to be an interface switching instruction (e.g., a slide operation that is performed for an application of the apparatus). In such embodiments, the apparatus can be configured to detect differences (e.g., in time, pressure, etc.) between the slide operations for various purposes. Meanwhile, a user of the apparatus is aware of the differences such that she can perform slide operations in different manners to trigger different functionalities of the apparatus. For example, a slide operation where the user's finger touches the touchscreen longer than a time threshold (e.g., 3 seconds) indicates a slide operation intended to be an interface switching instruction. For another example, a slide operation where the user's finger applies on the touchscreen a pressure higher than a pressure threshold indicates a slide operation intended to be an interface switching instruction. In some embodiments, slide operation intended to indicate interface switching instructions can be distinguished from other slide operations in any other suitable method.

At S302, the apparatus determines, based on the interface switching instruction, a two-dimensional direction from a stored set of two-dimensional directions, where the determined two-dimensional direction most closely matches the track of the slide operation. Specifically, the apparatus compares the track of the slide operation with the two-dimensional directions from the stored set of two-dimensional directions, and determines the two-dimensional direction that most closely matches the track of the slide operation.

For example, FIG. 9 is a schematic diagram illustrating a user terminal 900 (i.e., an apparatus) detecting and analyzing slide operations entered by a user in accordance with some embodiments. As shown in FIG. 9, the user can perform a first slide operation on the application interface that is currently displayed at the touchscreen 950 of the user terminal 900. The first slide operation has a track 960 that deviates from the vertical upward direction (i.e., the direction 910 in FIG. 9) with an angle α. Alternatively, the user can perform a second slide on the currently-displayed application interface. The second slide operation has a track 970 including a first portion that overlaps with a portion of the track 960, and a second portion that further deviates from the track 960 with an angle β.

Assume that the stored set of two-dimensional directions includes a vertical upward direction (i.e., the direction 910 in FIG. 9), a horizontal left-to-right direction, but no diagonal direction from lower-left to upper-right. Further assume that if the track of a slide operation deviates from the vertical upward direction with an angle greater than an angle γ (where α<γ<α+β), then the slide operation is determined to indicate a horizontal direction. Otherwise, if the track of a slide operation deviates from the vertical upward direction with an angle less than or equal to the angle γ, then the slide operation is determined to indicate a vertical direction. Thus, the track 960 and the first portion of the track 970 both indicate the vertical upward direction, while the second portion of the track 970 indicates the horizontal left-to-right direction.

Accordingly, the user terminal 900 compares the track 960 with the two-dimensional directions from the stored set of two-dimensional directions, and determines that the vertical upward direction most closely matches the track 960. Thus, the vertical upward direction is determined to be the two-dimensional direction for the interface switching instruction indicated by the first slide operation.

Returning to FIG. 3, at S303, the apparatus determines that a detected length of the track of the slide operation projected onto the two-dimensional direction is greater than a first length threshold. In some embodiments, if the detected length of the track of the slide operation projected onto the two-dimensional direction is greater than the first length threshold, then the apparatus determines that the user intends to perform the interface switching operation. As a result, the apparatus proceeds with the method 300 and performs the subsequent steps S304-S306. Otherwise, if the detected length of the track of the slide operation projected onto the two-dimensional direction is less than or equal to the first length threshold, then the apparatus determines that the user intends to cancel the interface switching instruction. As a result, the apparatus aborts the interface switching operation and refrains from performing any subsequent step of the method 300.

In the example of FIG. 9, assume the first length threshold is the length threshold 920. As shown in FIG. 9, the detected length of the track 960 of the first slide operation projected onto the direction 910 (i.e., the vertical upward direction) is greater than the length threshold 920. Thus, the subsequent steps of the interface switching operation can be performed. Otherwise (although not shown in FIG. 9), if the detected length of the track of another slide operation (not shown in FIG. 9) projected onto the direction 910 is less than or equal to the length threshold 920, the interface switching operation triggered by that slide operation will be aborted.

Returning to FIG. 3, at S304, the apparatus retrieves a predefined database that includes two-dimensional location information associated with a group of application interfaces. The group of application interfaces includes the original application interface. Operations of S304 are similar to the operations of S102 and S202 shown and described above with respect to FIGS. 1 and 2.

Next, at S305, the apparatus determines, based on the two-dimensional location information included in the predefined database and the two-dimensional direction, a target application interface from the group of application interfaces. Operations of S305 are similar to the operations of S103 and S203 shown and described above with respect to FIGS. 1 and 2. Finally, at S306, the apparatus switches to display the target application interface at the apparatus. Operations of S306 are similar to the operations of S104 shown and described above with respect to FIG. 1.

Figure 4:
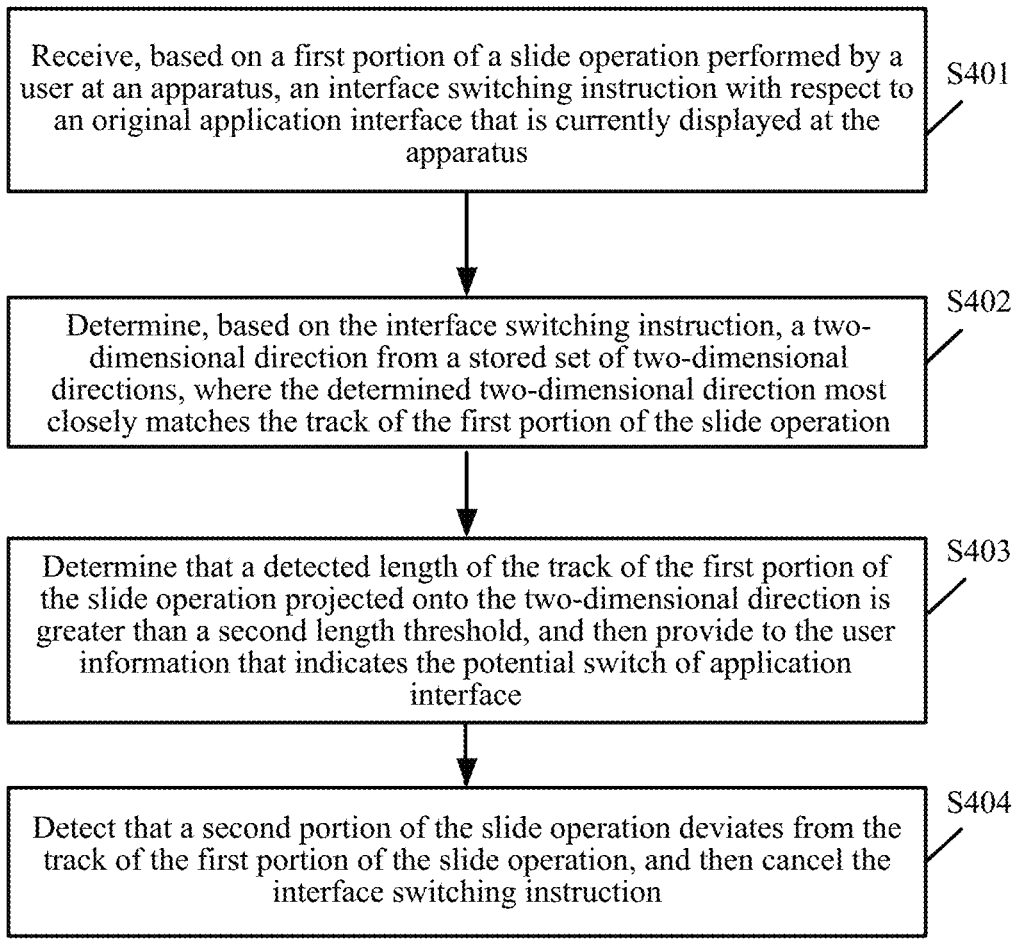
FIG. 4 is a flow chart illustrating another method performed at an apparatus for switching an application interface in accordance with some embodiments.

FIG. 4 is a flow chart illustrating another method 400 performed at an apparatus for switching an application interface in accordance with some embodiments. The apparatus performing the method 400 can be structurally and functionally similar to the apparatus performing the method 100 described above with respect to FIG. 1. Particularly, the apparatus performing the method 400 can include one or more processors and memory. The method 400 is implemented using instructions or code of an application that are stored in a non-transitory computer readable storage medium of the apparatus and executed by the one or more processors of the apparatus. The application is associated with switching from a currently-displayed application interface (e.g., an original application interface) to a to-be-displayed application interface (e.g., a target application interface). Such an application can be stored in a memory of the apparatus (e.g., the non-transitory computer readable storage medium of the apparatus) and executed at a processor of the apparatus. As shown in FIG. 4, the method 400 includes the following steps.

Operations of S401-S402 are similar to the operations of S101, S201, and S301-S302 shown and described above with respect to FIGS. 1-3. Specifically, at S401, the apparatus receives, based on a first portion of a slide operation performed by a user at an apparatus, an interface switching instruction with respect to an original application interface that is currently displayed at the apparatus. Next, at S402, the apparatus determines, based on the interface switching instruction, a two-dimensional direction from a stored set of two-dimensional directions, where the determined two-dimensional direction most closely matches the track of the first portion of the slide operation.

In the example of FIG. 9, the user terminal 900 detects a first portion of the track 970 for the second slide operation, which overlaps with a portion of the track 960 and deviates from the direction 910 (i.e., the vertical upward direction) with the angle α. As discussed above, assume that if the track of a slide operation deviates from the vertical upward direction with an angle less than or equal to the angle γ, then the slide operation is determined to indicate a vertical direction. Also assume that α<γ. Thus, the user terminal 900 determines, based on the interface switching instruction indicated by the first portion of the second slide operation, that the direction 910 (i.e., the vertical upward direction) most closely matches the first portion of the track 970.

At S403, the apparatus determines that a detected length of the track of the first portion of the slide operation projected onto the two-dimensional direction is greater than a second length threshold. The apparatus then provides to the user information that indicates the potential switch of application interface. In some embodiments, the second length threshold is less than the first length threshold. Thus, in such embodiments, the apparatus provides to the user information indicating the potential interface switching prior to the apparatus comparing the projected length of the track of the slide operation with the first length threshold.

In other words, the apparatus detects and monitors the track of the slide operation as the slide operation is being performed. The apparatus first compares the projected length of the track of the slide operation (i.e., projected onto the two-dimensional direction) with the second length threshold. After the projected length of the track of the slide operation exceeds the second length threshold, the apparatus provides to the user information indicating the potential interface switching. The apparatus then compares the projected length of the track of the slide operation with the first length threshold. After the projected length of the track of the slide operation exceeds the first length threshold, the apparatus performs the subsequent steps (e.g., S304-S306 in the method 300 in FIG. 3) to complete the interface switching operation.

In some embodiments, the information indicating the potential switch of application interface can be provided to the user in any suitable form using any suitable method. For example, the apparatus can display a portion of the target application interface. For another example, the apparatus can display a message "switching interface" to the user. For yet another example, the apparatus can produce an audio signal (e.g., a ringtone) to indicate the potential interface switching to the user. After the user receives the indication of the potential switch of application interface, the user can decide to complete the interface switching operation by continuing performing the slide operation. As discussed above with respect to the method 300 in FIG. 3, the interface switching operation can be completed if the projected length of the track of the slide operation exceeds the first length threshold. Alternatively, the user can decide to abort the interface switching operation by, for example, terminating the slide operation before the projected length of the track of the slide operation reaches the first length threshold.

In the example of FIG. 9, the user performs the first slide operation that has the track 960. After the track 960 reaches a point where the length of the track 960 projected onto the direction 910 (i.e., the vertical upward direction) exceeds the length threshold 930 (i.e., the second length threshold), the user terminal 900 provides to the user information indicating the potential switch of application interface by, for example, displaying a portion of the target application interface in the touchscreen 950, displaying a message indicating the interface switching operation that is undergoing, producing a ringtone customized for a switch of application interface, and/or the like.

Furthermore, as shown in FIG. 9, after the track 960 reaches a point where the length of the track 960 projected onto the direction 910 exceeds the length threshold 920 (i.e., the first length threshold), the user terminal 900 performs the remaining steps to complete the interface switching operation. As a result, the currently-displayed application interface is replaced by a target application interface on the touchscreen 950. Alternatively, although not shown in FIG. 9, if the user terminates the first slide operation before the track 960 reaching the point where the length of the track 960 projected onto the direction 910 exceeds the length threshold 920, the user terminal 900 aborts the interface switching operation and the currently-displayed application interface is not replaced by any target application interface.

Returning to FIG. 4, at S404, the apparatus detects that a second portion of the slide operation deviates from the track of the first portion of the slide operation. The apparatus then cancels the interface switching instruction. Specifically, similar to detecting a termination of the slide operation, as a result of detecting the deviation, the apparatus determines that the user changes her mind and does not intend to complete the interface switching operation anymore. Thus, the apparatus aborts the interface switching operation.

In some embodiments, the apparatus can determine that the track of the second portion of the slide operation deviates from the track of the first portion of the slide operation in various methods. For example, the apparatus can determine that the track of the second portion of the slide operation deviates from the two-dimensional direction (which is determined based on the track of the first portion of the slide operation) with an angle greater than the threshold angle (e.g., the angle γ discussed above with respect to the method 300 in FIG. 3), which was used to determine the two-dimensional direction based on the track of the first portion of the slide operation. For another example, the apparatus can determine that the track of the second portion of the slide operation deviates from the track of the first portion of the slide operation with an angle greater than another threshold angle.

In the example of FIG. 9, the user terminal 900 detects that the first portion of the track 970 for the second slide operation (which overlaps with a portion of the track 960 for the first slide operation) deviates from the direction 910 (i.e., the determined vertical upward direction) with the angle α. The user terminal 900 also detects that the second portion of the track 970 for the second slide operation further deviates from the first portion of the track 970 with the angle β. In some embodiments, the user terminal 900 can determine that the user intends to cancel the interface switching instruction based on the deviation of the second portion of the track 970 from the direction 910, α+β, being greater than the threshold angle γ that was used to determine the direction 910 for the first portion of the track 970. Alternatively, in some other embodiments, the user terminal 900 can determine that the user intends to cancel the interface switching instruction based on the deviation of the second portion of the track 970 from the first portion of the track 970, β, being greater than a threshold angle δ (not shown in FIG. 9).

The example of FIG. 9 illustrates the scenario where the second portion of track 970 deviates more from the determined two-dimensional direction 910 than the first portion of the track 970 (that is, α+β>α). In some embodiments, although not shown in FIG. 9, the second portion of a track of a slide operation deviates from the first portion of the track (e.g., with an angle greater than the threshold angle γ), while deviating less from the determined two-dimensional direction than the first portion of the track. For example, instead of deviating to the right side of the first portion of the track 970 with the angle β, the second portion of the track 970 can deviate to the left side of the first portion of the track 970 with the angle β. In such a scenario, although the second portion of the track deviates from the first portion of the track (β>δ), the apparatus can determine that the user intends to complete the interface switching operation because the second portion of the track returns to the determined direction from the first portion of the track (i.e., the angle α-β indicates a return to the determined direction from the deviation indicated by the previous angle α). Thus, in that scenario, the apparatus will continue performing the interface switching operation.

In some embodiments, as discussed above, a user can cancel an interface switching instruction by, for example, terminating the slide operation before the length of the track of the slide operation reaches a certain point, or deviating the track of the slide operation further away from the determined two-dimensional direction. In some embodiments, an apparatus will complete an interface switching operation if and only if both the length requirement and the deviation requirement on the slide operation are satisfied. That is, the apparatus will complete an interface switching operation if and only if the length of the track of the slide operation reaches the certain point, and the track of the slide operation does not deviate further away from the determined two-dimensional direction. In some embodiments, although not shown herein, a user can cancel an interface switching instruction using any other suitable method. In those embodiments, the apparatus can monitor the slide operation performed by the user accordingly, in order to determine whether to continue or abort the corresponding interface switching operation.

Figure 5:
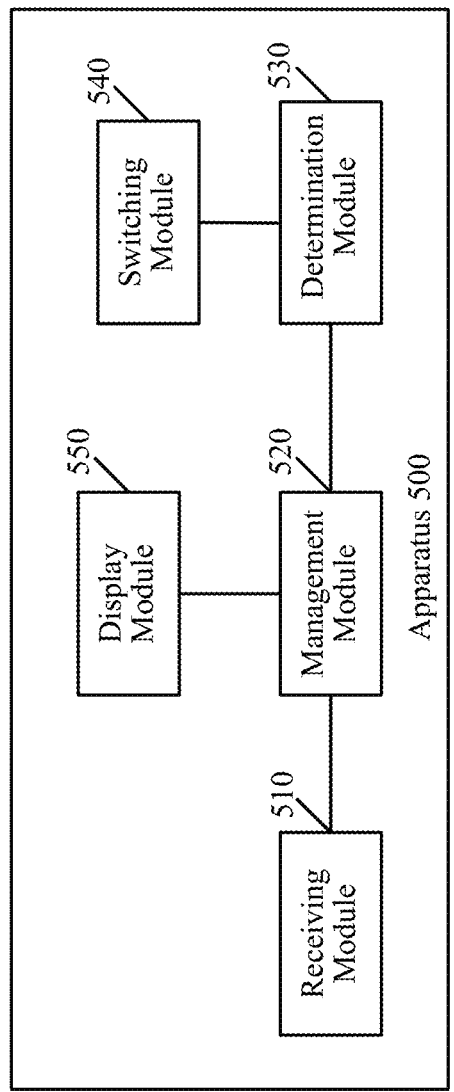
FIG. 5 is a block diagram illustrating modules of an apparatus for switching an application interface in accordance with some embodiments.

FIG. 5 is a block diagram illustrating modules of an apparatus 500 for switching an application interface in accordance with some embodiments. The apparatus 500 can be structurally and functionally similar to the apparatuses and user terminals shown and/or described with respect to FIGS. 1-4 and 8-9. As shown in FIG. 5, the apparatus 500 includes a receiving module 510, a management module 520, a determination module 530, a switching module 540, and a display module 550. In some embodiments, the apparatus 500 can include more or less modules than those shown in FIG. 5.

In some embodiments, each module included in the apparatus 500 can be a hardware-based module (e.g., a digital signal processor (DSP), an application-specific integrated circuit (ASIC), a field programmable gate array (FPGA), etc.), a software-based module (e.g., a module of computer code executed at a processor, a set of processor-readable instructions executed at a processor, etc.), or a combination of hardware and software modules. Instructions or code of each module can be stored in a memory of the apparatus 500 (not shown in FIG. 5) and executed at a processor (e.g., a CPU) of the apparatus 500 (not shown in FIG. 5). Overall, the receiving module 510, the management module 520, the determination module 530, the switching module 540 and the display module 550 can be configured to collectively perform the methods 100-400 shown and described above with respect to FIGS. 1-4.

Specifically, the receiving module 510 is configured to, among other functions, receive interface switching instructions from users of the apparatus 500. As discussed above, the receiving module 510 can receive interface switching instructions that are entered by the users using various input methods. In some embodiments, each interface switching instruction received at the receiving module 510 includes information indicating a two-dimensional direction from a set of two-dimensional directions. Such a set of two-dimensional directions can be predefined and/or configured by the users of the apparatus 500, and stored at, for example, a memory of the apparatus 500 (not shown in FIG. 5) prior to the receiving module 510 receiving any interface switching instruction. In some embodiments, the stored set of two-dimensional directions includes at least a vertical direction, a horizontal direction, and a diagonal direction. Particularly, functions of the receiving module 510 are shown and described above with respect to FIGS. 8 and 9.

The management module 520 is configured to, among other functions, retrieve a predefined database that includes two-dimensional location information associated with a group of application interfaces. As discussed above, each application interface from the group of application interfaces can be potentially displayed at the apparatus 500. Furthermore, each application interface from the group of application interfaces can be an original application interface, which can be potentially switched to a target application interface from the group of application interfaces. As shown and described above with respect to FIG. 10, two-dimensional location information associated with the group of multiple application interfaces can be arranged in various methods, and information of the arrangement and associations among the application interfaces can be stored in the predefined database.

The determination module 530 is configured to, among other functions, determine a target application interface from the group of application interfaces for an original application interface from the group of application interfaces. As discussed above, the determination module 530 can make such a determination based on the two-dimensional direction indicated by the interface switching instruction and the two-dimensional location information included in the predefined database.

The switching module 540 is configured to, among other functions, replace an original application interface with a target application interface (determined by the determination module 530) at the display of the apparatus 500.

The display module 550 is configured to, among other functions, display an identification of a target application interface when the apparatus 500 switches to display that target application interface. Such identification can be in any suitable form such as, for example, text, image, symbol, icon, number, animation, and/or the like.

Figure 6:
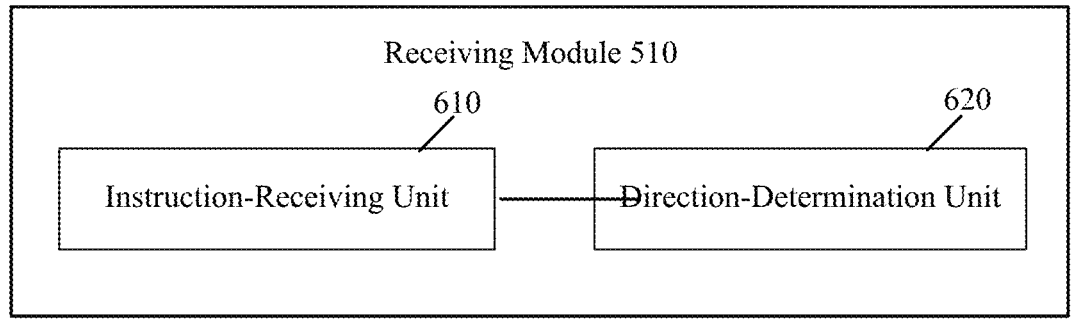
FIG. 6 is a block diagram illustrating components of a module of the apparatus in FIG. 5 in accordance with some embodiments.

FIG. 6 is a block diagram illustrating components of the receiving module 510 of the apparatus 500 in FIG. 5 in accordance with some embodiments. As shown in FIG. 6, the receiving module 510 includes an instruction-receiving unit 610 and a direction-determination unit 620. Each of the two units can be a hardware-based module (e.g., a DSP, an ASIC, a FPGA, etc.), a software-based module (e.g., a module of computer code executed at a processor, a set of processor-readable instructions executed at a processor, etc.), or a combination of hardware and software modules. Instructions or code of each unit can be stored in a memory of the apparatus 500 (not shown in FIG. 5 or FIG. 6) and executed at a processor (e.g., a CPU) of the apparatus 500 (not shown in FIG. 5 or FIG. 6). Overall, the instruction-receiving unit 610 and the direction-determination unit 620 can be configured to collectively perform the corresponding function in the methods 100-400 shown and described with respect to FIGS. 1-4.

Specifically, the instruction-receiving unit 610 is configured to, among other functions, detect a slide operation performed at the apparatus 500 (e.g., on a touchscreen of the apparatus 500, not shown in FIG. 5 or FIG. 6), and receive an interface switching instruction indicated by the detected slide operation. For example, as shown and described above with respect to FIG. 8, an instruction-receiving unit within a receiving module of the user terminal 800 detects the slide operation performed by the user on the touchscreen 850 of the user terminal 800. The instruction-receiving unit further receives the interface switching instruction indicated by the slide operation.

The direction-determination unit 620 is configured to, among other functions, determine a two-dimensional direction for the interface switching instruction based on the slide operation detected by the instruction-receiving unit 610. The direction-determination unit 620 can compare the track of the detected slide operation with each two-dimensional direction from the stored set of two-dimensional directions, and determine the two-dimensional direction from the stored set of two-dimensional directions that most closely matches the track of the slide operation. For example, as shown and described above with respect to FIG. 9, a direction-determination unit within a receiving module of the user terminal 900 determines that the direction 910 is the two-dimensional direction for the track 960 based on a determination that the direction 910, when compared with other two-dimensional directions from the stored set of two-dimensional directions, most closely matches the track 960.

Figure 7:
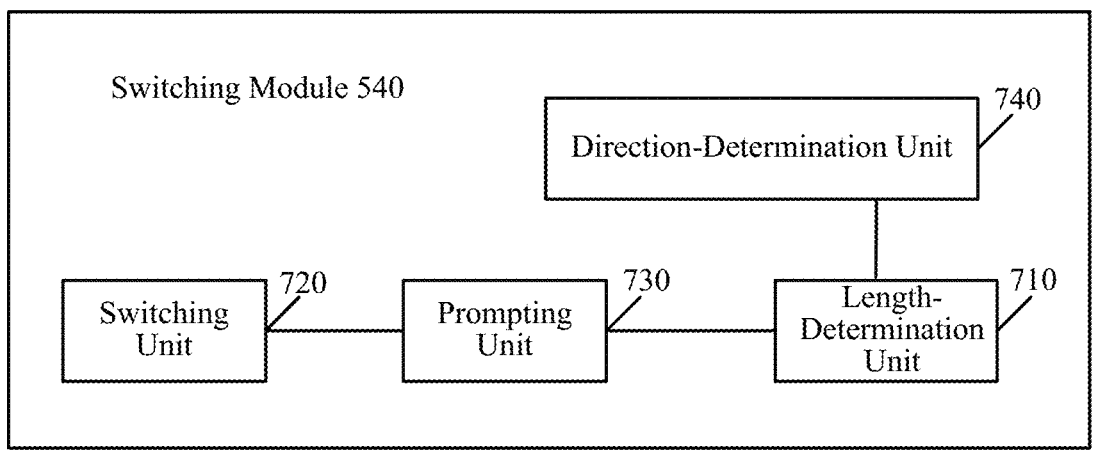
FIG. 7 is a block diagram illustrating components of another module of the apparatus in FIG. 5 in accordance with some embodiments.

FIG. 7 is a block diagram illustrating components of the switching module 540 of the apparatus 500 in FIG. 5 in accordance with some embodiments. As shown in FIG. 7, the switching module 540 includes a length-determination unit 710, a switching unit 720, a prompting unit 730 and a direction-determination unit 740. Each of these four units can be a hardware-based module (e.g., a DSP, an ASIC, a FPGA, etc.), a software-based module (e.g., a module of computer code executed at a processor, a set of processor-readable instructions executed at a processor, etc.), or a combination of hardware and software modules. Instructions or code of each unit can be stored in a memory of the apparatus 500 (not shown in FIG. 5 or FIG. 7) and executed at a processor (e.g., a CPU) of the apparatus 500 (not shown in FIG. 5 or FIG. 7). Overall, the length-determination unit 710, the switching unit 720, the prompting unit 730 and the direction-determination unit 740 can be configured to collectively perform the corresponding function in the methods 100-400 shown and described with respect to FIGS. 1-4. Particularly, functions of the units within the switching module 540 are shown and described above with respect to FIG. 9.

Specifically, the length-determination unit 710 is configured to, among other functions, determine if a length of a track of a slide operation projected onto the two-dimensional direction determined for that slide operation exceeds a first length threshold. In some embodiments, in order to make such a determination promptly, the length-determination unit 710 detects and monitors the slide operation that is being performed, and periodically (e.g., every 0.1 second) compares the projected length of the track of the slide operation with the first length threshold. In some embodiments, the first length threshold can be a predefined, default value. In some embodiments, the first length threshold can be configured or modified by a user of the apparatus.

In response to a positive determination by the length-determination unit 710 that the projected length of the track of the slide operation exceeds the first length threshold, the switching unit 720 switches to display the target application interface. In other words, the switching unit 720 is configured to replace the original application interface with the target application interface at the display of the apparatus 500 in response to the positive determination made by the length-determination unit 710.

Furthermore, the length-determination unit 710 is also configured to determine if the length of the track of the slide operation projected onto the two-dimensional direction exceeds a second length threshold, which can be less than the first length threshold. In some embodiments, in order to make such a determination promptly, the length-determination unit 710 detects and monitors the slide operation that is being performed, and periodically (e.g., every 0.1 second) compares the projected length of the track of the slide operation with the second length threshold. In some embodiments, the second length threshold can be a predefined, default value. In some embodiments, the second length threshold can be configured or modified by a user of the apparatus.

In response to a positive determination by the length-determination unit 710 that the projected length of the track of the slide operation exceeds the second length threshold, the prompting unit 730 provides to the user of the apparatus 500 information indicating the potential switch of application interface. In other words, the prompting unit 730 is configured to, for example, prompt to the user a message indicating the potential switch of application interface, produce a ringtone indicating the potential switch of application interface, display a portion of the target application interface, and/or the like.

The direction-determination unit 740 is configured to, among other functions, detect and monitor the direction of a track of a slide operation. As discussed above, if the direction-determination unit 740 detects that the track of the slide operation deviates, to a certain extent, from the two-dimensional direction determined for that slide operation (after the length-determination unit 710 determines that the projected length of the track of that slide operation exceeds the second length threshold, or at any point during the slide operation), the direction-determination unit 740 can trigger the apparatus 500 to cancel the interface switching instruction and abort the interface switching operation. In some embodiments, as shown and discussed above with respect to FIG. 9, the direction-determination unit 740 can make such a determination using various methods.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Terms "first," "second," "third," "fourth," and the like (if any) in the specifications and claims and the foregoing accompanying drawings of the present application are used for distinguishing similar objects, and need not be used for describing a specific sequence or precedence order. It should be understood that data used in this case may be exchanged in a proper situation, so that the embodiments of the present application described herein can be performed in a sequence besides, for example, sequences shown or described herein. In addition, terms "include" and "have" and any forms thereof are intend to cover non-exclusive including, for example, including a process, a method, a system, a product or a device of a series of steps or units, but not limited to the steps or units that are clearly listed, and may include other steps or units which are inherent in the process, method, product or device or which is not clearly listed.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of switching an application interface at an apparatus that includes a display, the method comprising:
   at a computer system having one or more processors and memory for storing programs to be executed by the one or more processors:
   receiving information of a virtual application super-interface, the virtual application super-interface comprising (i) a plurality of application interfaces arranged in a two-dimensional grid including three rows and three columns, (ii) each of the plurality of application interfaces occupying a specific position on the two-dimensional grid defined by a respective row and a respective column within the three rows and the three columns, (iii) each of the plurality of the application interfaces being a screen size of the apparatus and including a respective predefined set of icons, and (iv) the plurality of application interfaces includes an original application interface occupying a center position of the two-dimensional grid;
   displaying on the apparatus the original application interface including a first group of icons, wherein each icon of the first group of icons on the original interface represents a distinct application program executed at the apparatus, wherein the original application interface has a horizontal direction, a vertical direction and two diagonal directions;
   receiving, from a user of the apparatus, one interface switching instruction to replace the original application interface with a target interface that is not currently present on the display, the interface switching instruction comprising a sliding operation on the original application interface;
   determining a two-dimensional direction corresponding to the sliding operation;
   determining a first angle for a detected length of the sliding operation projected onto the two-dimensional direction;
   determining, based on the first angle, that the switching instruction corresponds to an instruction to replace the original application interface with a first target application interface that is located in one of the two diagonal directions of the original application interface;
   in response:
   retrieving a predefined database corresponding to the virtual application super-interface that includes two-dimensional location information associated with each of the plurality of application interfaces, each application interface including a respective predefined set of icons and each icon in the respective set representing a distinct application program executed at the apparatus;
   identifying, based on the first angle and the two-dimensional location information included in the predefined database, the first target application interface from the plurality of application interfaces and a corresponding predefined set of icons;
   detecting a continuation of the sliding operation, wherein the continuation of the sliding action deviates from the first angle by a deviation angle;
   in response to a switching angle being less than a threshold angle, rendering, on the display of the apparatus, the first target application interface in replacement of the original application interface, including the corresponding predefined set of icons; and
   in response to the switching angle being greater than the threshold angle, canceling the application switching instruction, wherein the switching angle is calculated based on the deviation angle or a sum of the first angle and the deviation angle.

2. The method of claim 1, wherein the original application interface and the target application interface are associated by the two-dimensional direction, and the association is stored in the predefined database.

3. The method of claim 1, wherein the two-dimensional direction is the direction from the stored set of two-dimensional directions that most closely matches the track of the slide operation.

4. The method of claim 1, further comprising:
   before displaying the first target application interface in replacement of the original application interface, determining that the detected length of the track of the slide operation projected onto the two-dimensional direction is greater than a first length threshold.

5. The method of claim 4, further comprising, before displaying the first target application interface in replacement of the original application interface:
   determining that the detected length of the track of the slide operation projected onto the two-dimensional direction is greater than a second length threshold that is less than the first length threshold; and
   providing to the user information that indicates the switch from the original application interface to the first target application interface.

6. The method of claim 5, wherein the providing information includes displaying a portion of the first target application interface at the apparatus.

7. An apparatus, comprising:
   a display;
   one or more processors; and
   memory storing one or more programs to be executed by the one or more processors, the one or more programs causing the processor to perform:
   receiving information of a virtual application super-interface, the virtual application super-interface comprising (i) a plurality of application interfaces arranged in a two-dimensional grid including three rows and three columns, (ii) each of the plurality of application interfaces occupying a specific position on the two-dimensional grid defined by a respective row and a respective column within the three rows and the three columns, (iii) each of the plurality of the application interfaces being a screen size of the apparatus and including a respective predefined set of icons, and (iv) the plurality of application interfaces includes an original application interface occupying a center position of the two-dimensional grid;

displaying on the apparatus the original application interface including a first group of icons, wherein each icon of the first group of icons on the original interface represents a distinct application program executed at the apparatus, wherein the original application interface has a horizontal direction, a vertical direction and two diagonal directions;

receiving, from a user of the apparatus, one interface switching instruction to replace the original application interface with a target interface that is not currently present on the display, the interface switching instruction comprising a sliding operation on the original application interface;

determining a two-dimensional direction from the sliding operation;

determining a first angle for a detected length of the sliding operation projected onto the two-dimensional direction;

determining, based on the first angle, that the switching instruction corresponds to an instruction to replace the original application interface with a first target application interface that is located in one of the two diagonal directions of the original application interface;

in response:
 retrieving a predefined database corresponding to the virtual application super-interface that includes two-dimensional location information associated with each of the plurality of application interfaces, each application interface including a respective predefined set of icons and each icon in the respective set representing a distinct application program executed at the apparatus;
 identifying, based on the first angle and the two-dimensional location information included in the predefined database, the first target application interface from the plurality of application interfaces and a corresponding predefined set of icons;
 detecting a continuation of the sliding operation, wherein the continuation of the sliding action deviates from the first angle by a deviation angle;
 in response to a switching angle being less than a threshold angle, rendering, on the display of the apparatus, the first target application interface in replacement of the original application interface, including the corresponding predefined set of icons; and
 in response to the switching angle being greater than the threshold angle, canceling the application switching instruction, wherein the switching angle is calculated based on the deviation angle or a sum of the first angle and the deviation angle.

8. The apparatus of claim 7, wherein the two-dimensional direction is the direction from the stored set of two-dimensional directions that most closely matches the track of the slide operation.

9. The apparatus of claim 7, wherein the processor further performs:
 before displaying the first target application interface in replacement of the original application interface, determining that the detected length of the track of the slide operation projected onto the two-dimensional direction is greater than a first length threshold.

10. The apparatus of claim 9, wherein the processor further performs, before displaying the first target application interface in replacement of the original application interface:
 determining that the detected length of the track of the slide operation projected onto the two-dimensional direction is greater than a second length threshold that is less than the first length threshold; and
 providing to the user information that indicates the switch from the original application interface to the first target application interface.

11. A non-transitory computer readable storage medium storing one or more programs, the one or more programs comprising instructions, which, when executed by one or more processors of an apparatus including a display, cause the processors to perform operations comprising:

receiving information of a virtual application super-interface, the virtual application super-interface comprising (i) a plurality of application interfaces arranged in a two-dimensional grid including three rows and three columns, (ii) each of the plurality of application interfaces occupying a specific position on the two-dimensional grid defined by a respective row and a respective column within the three rows and the three columns, (iii) each of the plurality of the application interfaces being a screen size of the apparatus and including a respective predefined set of icons, and (iv) the plurality of application interfaces includes an original application interface occupying a center position of the two-dimensional grid;

displaying on an apparatus the original application interface including a first group of icons, wherein each icon of the first group of icons on the original interface represents a distinct application program executed at the apparatus, wherein the original application interface has a horizontal direction, a vertical direction and two diagonal directions;

receiving, from a user of the apparatus, one interface switching instruction to replace the original application interface with a target interface that is not currently present on the display, the interface switching instruction comprising a sliding operation on the original application interface;

determining a two-dimensional direction from the sliding operation;

determining a first angle for a detected length of the sliding operation projected onto the two-dimensional direction;

determining, based on the first angle, that the switching instruction corresponds to an instruction to replace the original application interface with a first target application interface that is located in one of the two diagonal directions of the original application interface;

in response:
 retrieving a predefined database corresponding to the virtual application super-interface that includes two-dimensional location information associated with each of the plurality of application interfaces, each application interface including a respective predefined set of icons and each icon in the respective set representing a distinct application program executed at the apparatus;

identifying, based on the first angle and the two-dimensional location information included in the predefined database, the first target application interface from the plurality of application interfaces and a corresponding predefined set of icons;

detecting a continuation of the sliding operation, wherein the continuation of the sliding action deviates from the first angle by a deviation angle;

in response to a switching angle being less than a threshold angle, rendering, on the display of the apparatus, the first target application interface in replacement of the original application interface, including the corresponding predefined set of icons; and in response to the switching angle being greater than the threshold angle, canceling the application switching instruction, wherein the switching angle is calculated based on the deviation angle or a sum of the first angle and the deviation angle.

12. The non-transitory computer readable storage medium of claim 11, wherein the two-dimensional direction is the direction from the stored set of two-dimensional directions that most closely matches the track of the slide operation.

13. The non-transitory computer readable storage medium of claim 11, the one or more programs further comprising instructions causing the processor to perform:

before rendering the first target application interface in replacement of the original application interface, determining that the detected length of the track of the slide operation projected onto the two-dimensional direction is greater than a first length threshold.

14. The non-transitory computer readable storage medium of claim 13, the one or more programs further comprising instructions causing the processor to perform, before displaying the first target application interface in replacement of the original application interface:

determining that the detected length of the track of the slide operation projected onto the two-dimensional direction is greater than a second length threshold that is less than the first length threshold; and providing to the user information that indicates the switch from the original application interface to the first target application interface.

\* \* \* \* \*